C. H. KOOS.
COLLAPSIBLE BUCKET.
APPLICATION FILED JULY 24, 1916.

1,260,779.

Patented Mar. 26, 1918.

WITNESSES

N. D. Williams.
B. F. Garvey Jr.

INVENTOR
Carl H. Koos
BY Richard Owen.
ATTORNEY

UNITED STATES PATENT OFFICE.

CARL HERBERT KOOS, OF DAVENPORT, IOWA.

COLLAPSIBLE BUCKET.

1,260,779.   Specification of Letters Patent.   Patented Mar. 26, 1918.

Application filed July 24, 1916. Serial No. 110,989.

*To all whom it may concern:*

Be it known that I, CARL HERBERT KOOS, a citizen of the United States, residing at Davenport, in the county of Scott and State of Iowa, have invented certain new and useful Improvements in Collapsible Buckets, of which the following is a specification.

This invention relates to receptacles and more especially to telescopical receptacles.

An object of the invention is to provide a receptacle which in this instance is used as a bucket and comprises a plurality of collapsible sections, said sections being equipped with suitable means to prevent casual displacement of the latter when in an operative position.

Another object is to provide a suitable straining means by which extraneous materials will be separated from the contents of the receptacle when said contents is being dispensed.

Other objects as well as the nature, characteristic features and scope of my invention will be more readily understood from the following description taken in connection with the accompanying drawings and pointed out in the claim forming a part of this specification.

Referring to the drawings:—

Figure 1:
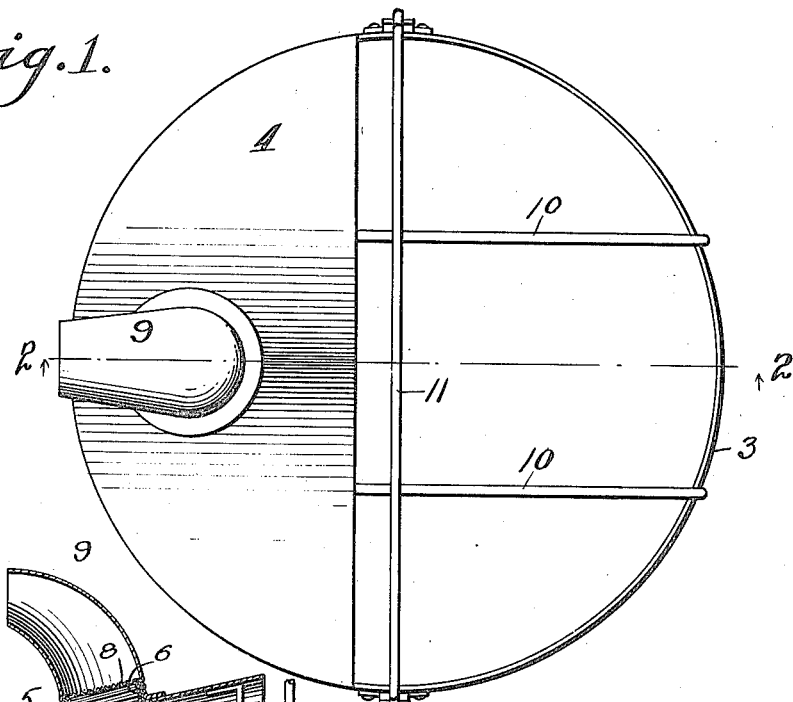
Figure 1 is a top plan view of a bucket constructed in accordance with my invention.
Figure 2:
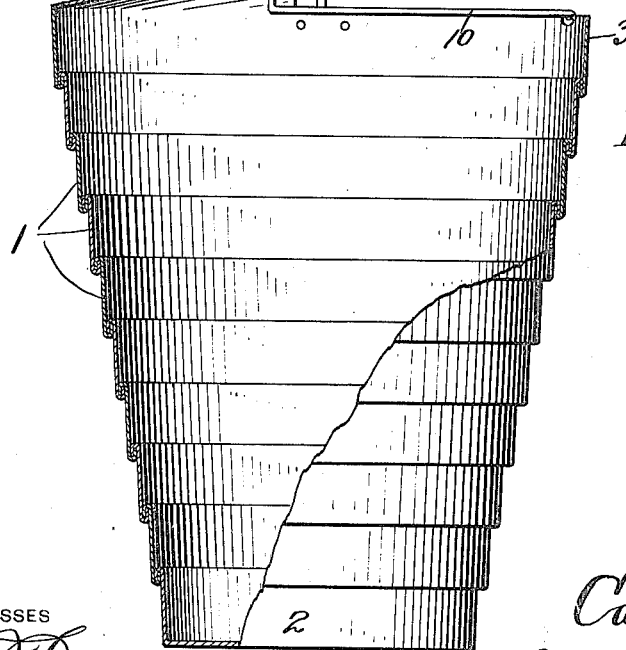
Fig. 2 is a side elevational view thereof, a part being broken away to disclose details.
Figure 3:
Fig. 3 is a side elevational view of a strainer used in this invention.

In the drawings, a plurality of sections 1 are provided which comprise annular rings, said rings gradually descreasing in diameter toward the bottom of the bucket. Each of said rings has the margins thereof folded in opposite directions to provide annular flanges, whereby to permit interlocking of said sections, the annular flanges serving as lap joints and providing a water tight connection between the sections. The lowermost of the sections, as indicated at 2, has its lower end closed, and is slightly higher than the sections 1, as shown in Fig. 2. The uppermost of the sections, as indicated at 3, is of a diameter in excess of any of the sections 1 and 2, and has a part of the upper end closed by extending one of the marginal sides 4 of the bucket. An opening is formed in said portion 4, through which the contents of said bucket is adapted to be dispensed, said closure having a screw-threaded nipple 5 formed about said opening into which a screen 6 is escrew-threaded. The screen 6 comprises a cylindrical tube, the upper end of which has a screen 8 mounted thereover, through which the contents of the bucket will be filtered, while being dispensed.

An arcuate spout 9 is threaded on the nipple 5 having the outer end thereof arranged substantially within the plane of the outer periphery of said section 3, whereby to facilitate dispensing contents of said bucket through a restricted opening, such as the opening in a radiator hood of an automobile, etc.

By arranging the strainer over the outlet of said bucket, it is seen that all foreign materials will be separated from the contents of the bucket, when said contents is being dispensed, while the spout 9 will regulate the volume of flow of said contents. It is well known that in filling automobile radiators and the like that it is desired to relieve the water of all impurities and to devise a means which can be conveniently carried in an automobile, and which could be used for obtaining water from creeks, etc., when passing through rural districts.

In order to prevent the sections 1 from being casually displaced when the device is in an inoperative position, brace rods 10 are provided, one end of each of which is engaged with the inner face of the member 4, while the opposite end of each is engaged with the section 3, whereby abutment is provided with obvious results. A bail 11 is also connected to said section 3 in order to facilitate transporting the bucket.

It will be understood that the above description and accompanying drawings comprehend only the general and preferred embodiment of my invention and that various minor changes in details of construction, proportion and arrangement of parts may be made within the scope of the appended claim without sacrificing any of the advantages of my invention.

I claim:—

A collapsible bucket including progressively tapering sections the largest of which is uppermost and is partially closed, rods engaged with the inner face of said closed portion and extending across the open extent of said uppermost section in a plane substantially parallel with the upper margin thereof and secured to said section whereby each section will be maintained completely nested within its adjacent section when the bucket is in an inoperative position.

In testimony whereof I affix my signature in presence of two witnesses.

CARL HERBERT KOOS.

Witnesses:
 EMIL DINGER,
 GEORGE THODE.